Dec. 16, 1941. D. E. DASHER Re. 21,976
REFRIGERATING APPARATUS
Original Filed Jan. 29, 1932
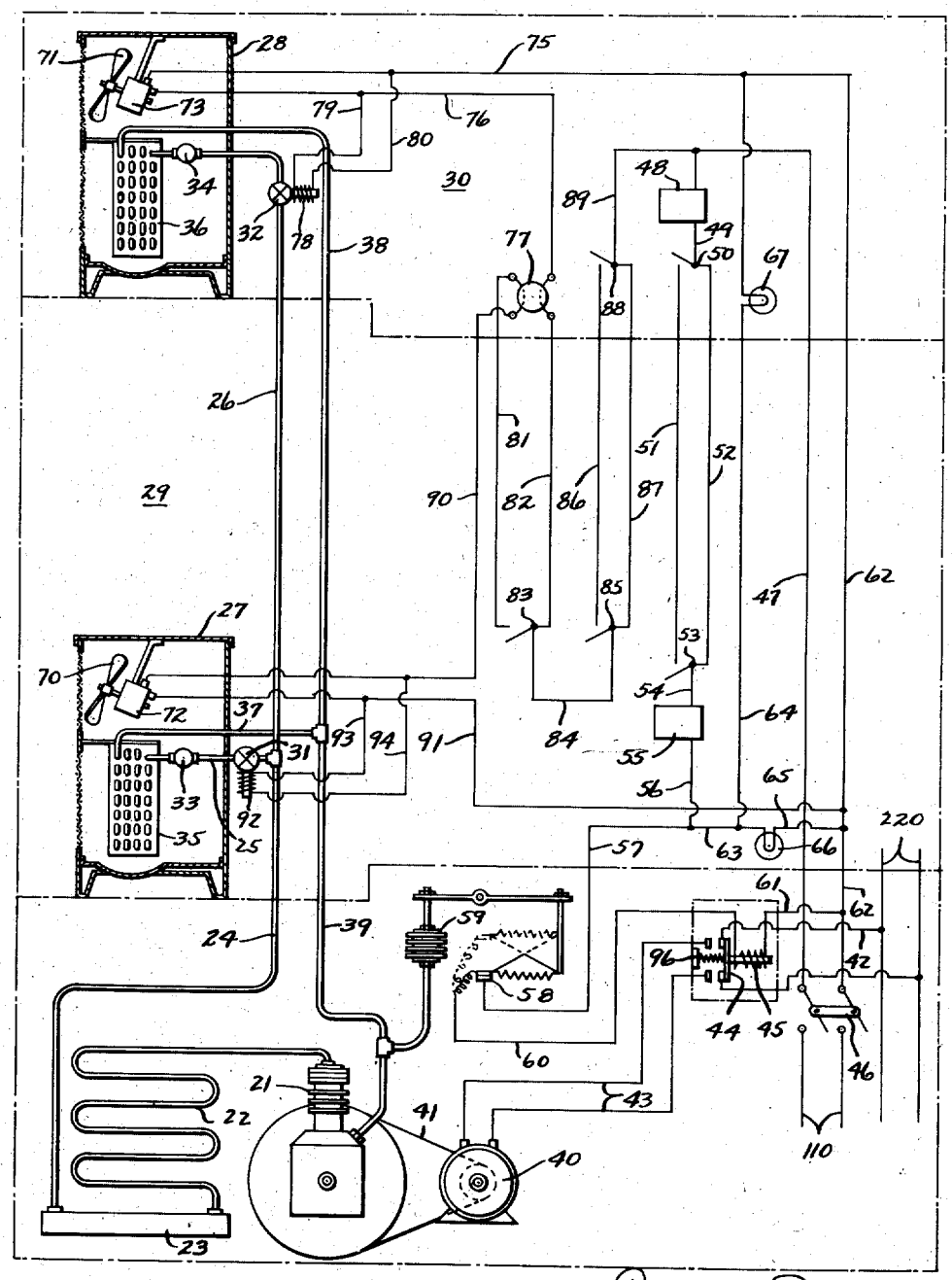
Don. E. Dasher, INVENTOR.
BY Spencer, Hardway & Fisher ATTORNEYS Reissued Dec. 16, 1941 Re. 21,976

UNITED STATES PATENT OFFICE 21,976

REFRIGERATING APPARATUS

Don E. Dasher, Dayton, Ohio, assignor, by mesne assignments, to General Motors Corporation, a corporation of Delaware Original No. 1,990,471, dated February 12, 1935, Serial No. 589,685, January 29, 1932. Renewed April 10, 1934. Application for reissue October 7, 1936, Serial No. 104,484

18 Claims. (Cl. 62—6)

This invention relates to refrigerating apparatus and more particularly to improved refrigerant air conditioning apparatus having improved control means.

At the present time there is need for an automatic air conditioning system which will be sufficiently simple and low in cost to be installed in residences. It has been found that it is too costly in most situations to provide an air conditioning system having ample capacity to cool the entire residence. However, in many instances, it has not been found satisfactory to cool only one room of the residence, since the occupants do not wish to be confined to one comfortable room, but desire that whichever room they wish to enter shall be air conditioned.

Consequently it is one of the objects of the invention to provide an improved air conditioning system of limited capacity and consequent low cost but capable of selectively conditioning any one or more of a plurality of rooms.

It is a more specific object of the invention to provide air conditioning means having evaporating means in a plurality of rooms but provided with a refrigerant liquefying apparatus sufficient only to properly cool and condition one of the rooms at a time in order to minimize the cost of the apparatus.

It is also highly desirable that the occupants of the residence when going from one room to another may conveniently control the apparatus so as at any time they may select the room or group of rooms they desire to be conditioned. Consequently it is another object of the invention to provide, for such a system, an improved control means which is selectively operable from each of the rooms provided with air conditioning means to select the room or group of rooms to be conditioned by the apparatus.

Further objects and advantages of the present invention will be apparent from the following description, reference being had to the accompanying drawing, wherein a preferred form of the invention is clearly shown.

In the drawing:

The figure is a diagrammatic illustration of my improved refrigerant air conditioning apparatus including my improved control means.

Referring to the drawing, there is shown for the purpose of illustrating my invention, a refrigerant air conditioning apparatus including a compressor 21 for compressing the refrigerant and for forwarding the refrigerant to a condenser 22 where the compressed refrigerant is condensed and collected in the receiver 23. This portion of the apparatus is termed the refrigerant liquefying apparatus. From the receiver 23 the liquid refrigerant is forwarded through conduit 24 and branch conduits 25 and 26 to air conditioning cabinets 27 and 28 located in the rooms 29 and 30. These branch conduits 25 and 26 are each provided with a solenoid operated valve, namely the valves 31 and 32. The branch conduits 25 and 26 are also provided with a suitable automatic expansion valve, namely the valves 33 and 34. The expansion valves 33 and 34 automatically control, according to the pressure of the refrigerant within their respective evaporators, the flow of liquid refrigerant to the evaporators 35 and 36 which are located within the air conditioning cabinets 27 and 28. The liquid refrigerant under reduced pressure evaporates in the evaporators 35 and 36 and this evaporated refrigerant is returned to the compressor 21 through the branch return conduits 37 and 38 and also the main return conduit 39.

The refrigerant liquefying apparatus may be located in any convenient place such as the basement of the dwelling. The compressor is driven by an electric motor 40 through pulley and belt means 41. The electric motor 40 is supplied with electric current from a 220 volt power line designated by reference character 220. The electric current is supplied from the power line 220 through the electrical conductors 42 and 43. The operation of the electric motor 40 is controlled by a switch 44 which is opened and closed by electromagnet means 45.

The electrical energy for the electric control system is supplied from a 110 volt power line designated by the reference character 110. This system is protected by means of a manually operated control switch 46. The electrical energy for the compressor motor control circuit is supplied through the electrical conductor 47 to a thermostatic control switch 48 located in the room 30 adjacent the cabinet 28 which switch is connected through the electrical conductor 49 to a single pole double throw switch commonly called a 3-way switch 50 also located in the room 30. From the 3-way switch 50 in the room 30 a pair of electrical conductors 51 and 52 extend to another single pole double throw or 3-way switch 53 located in the room 29 adjacent the cabinet 27. This switch is connected by means of the electrical conductor 54 to a thermostatic switch 55 also located in the room 29. A thermostatic control switch 55 is connected by means of the electrical conductors 56 and 57 with a snap acting switch 58 operated by a suitable bellows means 59 connected to the return conduit 39 of the refrigerating apparatus. This snap acting low pressure control switch 58 is connected by means of the electrical conductor 60 to operate the electromagnet means 45 for opening and closing the switch 44, which electromagnet means is connected by means of the conductor 61 to electrical conductor 62 which is return line or second wire of the 110 volt system. A light spring 96 or other suitable means holds the switch 44 open when the electromagnet means 45 is not energized.

It will be understood that when both of the thermostats and all of the switches in this system are closed that the electromagnet means 45 will hold the switch 44 in closed position. Should one of the switches or one of the thermostats open the control circuit, the switch 44 will be opened by the spring 96 to stop the electric motor 40 and the compressor 21. This system is also provided with means for indicating in both of the rooms 29 and 30 whether the compressor is in operation or not. This is done by a signaling system which comprises an electric conductor 63 which connects to the electrical conductors 64 and 65, each of which are provided with a signaling lamp, one of which, 66, is located within the room 29 while the other, 67, is located within the room 30. The electrical conductors 65 and 64 are finally connected to the electrical conductor 62 of the 110 volt circuit to complete the signaling system.

Each of the air conditioning cabinets 27 and 28 are provided with a fan 70 and 71 which are driven by the electric motors 72 and 73 respectively. These fans 70 and 71 circulate air from the room over the evaporators 35 and 36 and in this way cool and condition the air within the rooms 29 and 30. A separate control system is provided for supplying electrical energy to the fans and fan motors 72 and 73 as well as to the solenoid-operated valves 31 and 32.

In this system there is provided an electrical conductor 75 which leads from the electrical conductor 62 to the fan motor 73 and an electrical conductor 76 which leads to a two circuit switch 77. The electromagnet 78 of the solenoid-operated valve 32 is connected in parallel to the electrical conductors 76 and 75 by means of the conductors 79 and 80. From the two-circuit switch 77 there extends a pair of electrical conductors 81 and 82 to a single pole double throw switch commonly called a three-way switch 83. The two-circuit switch 77 is located within the room 30 while the three-way switch 83 is located within the room 29. From the three-way switch 83 an electrical conductor 84 extends to another three-way switch 85 also located within the room 29. From the three-way switch 85 a pair of electrical conductors 86 and 87 extend to a three-way switch 88 located within the room 30. From the three-way switch 88 an electrical conductor 89 extends to the other wire 47 of the 110 volt circuit. From the two-circuit switch 77 located within the room 30 an electrical conductor 90 extends to the electric fan motor 72 located within the air conditioning cabinet 27 in the room 29. Another electrical conductor 91 extends from the electrical motor 72 to the electrical conductor 62 of the 110 volt circuit. The electrical magnet means 92 of the solenoid-operated valve 31 is connected in parallel to the electric fan motor circuit for the fan 70 by means of the electrical conductors 93 and 94. By means of the last mentioned control circuit, it is possible to selectively cause from either room the operation of either fan or to stop the operation of either or both fans from either room and at the same time to control the valves 31 and 32.

When one of the electric motors 72 or 73 is in operation driving its respective fan, its respective solenoid-operated valve 31 or 32 will be open since these valves are connected in parallel to the electric fan motor circuit. Consequently, when the fan is in operation, its respective solenoid-operated valve will be open. If the fan is not in operation, its valve will be closed. The control circuit for the fan motors and solenoid-operated valve is so designed that only one of the electric fan motors can be in operation at one time. This is necessary, since in this system the refrigerant liquefying apparatus is made of only such a capacity as to adequately supply one of the evaporators 35 or 36. Consequently, it is necessary that the control circuit for the fan motors be so designed as to permit the operation of only one of the fan motors and the opening of one of the valves at a time. The control circuit of the fan motor is also designed so that both of the fan motors can be shut off at one time, if desirable.

The operation of my improved system is as follows:

The three-way switches 50 and 53 of the compressor motor control circuit are shown closed and the operation of the refrigerant liquefying apparatus is thus dependent on the thermostatic control switches 55, 48 as well as the pressure responsive snap acting switch 58. The pressure responsive snap acting switch 58 however also is shown closed. The main or primary switch of the compressor motor circuit is open, preventing operation of the compressor. Under these conditions it will be found that the thermostatic switch 48 located in the room 30 is open, preventing the operation of the motor 40 and the compressor 21.

At the same time in the fan motor circuit it will be found that the two-circuit switch 77 is in position connecting the electrical conductors 76 and 82. The three-way switch 83 is in position connecting the electrical conductors 82 and 84, while the three-way switches 85 and 88 are in position to connect electrical conductors 84, 87 and 89 to complete the electrical circuit for the fan motor 73. Through this circuit electrical energy will be supplied to the fan motor 73 to cause operation of the fan 71. Inasmuch as the solenoid and the electromagnet means 78 of the solenoid valve 32 are in parallel with the fan motor 73, the solenoid-operated valve 32 will be held open at this time, thereby permitting refrigerant to be supplied to the evaporator 36 within the cabinet 28, providing the refrigerant liquefying apparatus is in operation. Inasmuch as the refrigerant liquefying apparatus is not in operation, no refrigerant will be supplied to the evaporator 36 and fan 73 will merely circulate the air in the room 30 until the room becomes sufficiently warm and close the thermostatic switch 48 to cause the operation of the refrigerant liquefying apparatus. If an occupant of either the room 30 or the room 29 wishes to prevent the operation of the refrigerant liquefying apparatus, he can without leaving either room open the motor control circuit by tripping either of the three-way switches 50 or 53. If it is desired to operate the system without the control of the thermostats 48 and 55, these thermostats may be shunted so as to prevent these thermostatic switches from opening the compressor motor control circuit. If the thermostatic switches 48 and 55 are shunted out as suggested above, the operation of the compressor motor 40 may be controlled from either of the rooms 29 or 30 by tripping either of the switches 50 or 53. This however, is subject to the pressure responsive switch 58 which opens the motor control circuit when the pressure within the return conduit 39 is lowered. In any case, the operation of the refrigerant liquefying apparatus will be indicated by the lighting of the signal lamp. If the three-way switch 88 within the room 30, or the three-way switch 85 within the room 29 is tripped, the operation of the fan motor 73 will cease and also the solenoid-operated valve 32 will close. The circuit of both of the fan motors will then be opened and neither fan 70 or 71 will operate. However, should either the switch 77, located in the room 30, or the three-way switch 83 located in room 29, be tripped, the electric circuit for the fan motor 73 and the valve 32 will be opened and the electric circuit for the fan motor 72 and the valve 31 will be closed, causing the opening of the solenoid-operated valve 31 and the operation of the fan 70 to circulate the air in the room 29 over the surfaces of the evaporator 35. Under these conditions, the air in both of the rooms will be warm and if the compressor is under the control of the thermostats 48 and 55, these thermostats will close, completing the compressor control circuit causing the operation of the refrigerant liquefying apparatus, and thereby supplying liquid refrigerant to the evaporator 35 thus cooling the air passing over the surfaces of the evaporator and thereby cooling the room.

Thus, it will be seen:

1. That the operation of the compressor can be controlled by a switch from either room or by thermostatic switches in either room and the operation indicated by signal lights in either room.

2. The operation of the fan circulating means for each air conditioning cabinet may be stopped from either room without causing the operation of the other fan circulating means.

3. The operation of either fan motor may be stopped from either room and the other circulating means started from either room.

4. The refrigerant liquefying apparatus is provided with automatic control means which stops the operation when neither of the air conditioning means are in operation.

Thus it will be seen that I have provided an improved air conditioning apparatus with improved control means which may be operated from a plurality of locations.

While the form of embodiment of the invention as herein disclosed, constitutes a preferred form, it is to be understood that other forms might be adopted, all coming within the scope of the claims which follow.

What is claimed is as follows:

1. An air conditioning system including a refrigerant liquefying apparatus, a room cooler located in each of two different rooms of a building, said room coolers each including regfrigerant evaporating means, said evaporating means being connected to said refrigerant liquefying apparatus, and control means for said system including means for controlling the flow of refrigerant through either of the above mentioned room coolers from either of the rooms occupied by room coolers.

2. An air conditioning system including a refrigerant liquefying apparatus, a room cooler located in each of two different rooms of a building, said room coolers each including refrigerant evaporating means, said evaporating means being connected to said refrigerant liquefying apparatus, and control means for said system including electrically-operated valve means for controlling the supply to either of said above mentioned evaporators, and electrical means for energizing said electrically-operated valve means for controlling the flow of refrigerant through either of the above mentioned room coolers from either of the rooms occupied by the room coolers.

3. An air conditioning system including a refrigerant liquefying apparatus, a room cooler located in each of two rooms of a building, said room coolers each including refrigerant evaporating means, said evaporating means of said room coolers being connected in parallel to said refrigerant liquefying apparatus, electrically-operated valve means at the entrance of each of said two evaporating means for controlling the flow of liquid refrigerant through each of said two room coolers, and electric circuit means having switch means in each of said two rooms for controlling either of said electrically-operated valve means from either room.

4. An air conditioning system including a refrigerant liquefying apparatus, a room cooler located in each of two rooms of a building, said room coolers each including refrigerant evaporating means, said evaporating means of said room coolers being connected in parallel to said refrigerant liquefying apparatus, a solenoid-operated valve means at the entrance of each of said two evaporating means for controlling the flow of liquid refrigerant through each of said two room coolers, and electric circuit means having switch means in each of said two rooms for controlling either of said solenoid-operated valve means from either room, and means for controlling the operation of said liquefying apparatus from either of said rooms.

5. An air conditioning system including a refrigerant liquefying apparatus, a room cooler located in each of two different rooms of a building, said room coolers each including refrigerant evaporating means, said evaporating means being connected to said refrigerant liquefying apparatus, fan means in each of said two room coolers for circulating air over said evaporating means, control means for said liquefying apparatus, and electric circuit means having switch means located in each of said rooms for controlling individually the operation of each of said fan means from either room.

6. An air conditioning system including a refrigerant liquefying apparatus, a room cooler located in each of two different rooms of a building, said room coolers each including refrigerant evaporating means, said evaporating means being connected to said refrigerant liquefying apparatus, control means for said system including means for controlling the flow of refrigerant through either of the above mentioned room coolers from either of the rooms occupied by room coolers, means for controlling the operation of the refrigerant liquefying apparatus from a point adjacent either of the room coolers, and a signal means in each of the rooms provided with room coolers for indicating operation of the liquefying apparatus.

7. An air conditioning system including a refrigerant liquefying apparatus, a room cooler located in each of two different rooms of a building, said room coolers each including refrigerant evaporating means, said evaporating means being connected to said refrigerant liquefying apparatus, control means for said system including means for controlling the flow of refrigerant through either of the above mentioned room coolers from either of the rooms occupied by room coolers, and means responsive to pressures within the refrigerating system for controlling the operation of the refrigerant liquefying apparatus.

8. An air conditioning system including at least one room cooler located in each of a plurality of rooms of a building, at least one of said room coolers in each of said rooms being provided with refrigerant evaporating means, and selective control means in each of said rooms, each of said control means being operable to overcome the control setting of the other control means to selectively control the operation of any one of the room coolers.

9. An air conditioning system including at least one room cooler located in each of a plurality of rooms of a building, at least one of said room coolers in each of said rooms being provided with refrigerant evaporating means, and selective control means in each of said rooms including means for controlling any one of the above mentioned room coolers from any one of the rooms occupied by the room coolers.

10. An air conditioning system including a refrigerant liquefying apparatus, a room cooler located in each of two different spaces to be conditioned, said room coolers each including refrigerant evaporating means, said evaporating means being connected to said refrigerant liquefying apparatus, control means for said system including means for controlling the flow of refrigerant through either of the above mentioned room coolers from a point convenient to either of the room coolers.

11. An air conditioning system including a refrigerant liquefying apparatus, a room cooler located in each of two different spaces to be conditioned, said room coolers each including refrigerant evaporating means, said evaporating means being connected to said refrigerant liquefying apparatus, control means for said system including means for controlling the flow of refrigerant through either of the above mentioned room coolers from a point convenient to either of the room coolers, and indicating means visible from each of the spaces to be conditioned for indicating operating conditions of the system.

12. An air conditioning system including a conditioner located in each of a plurality of spaces to be conditioned, selective control means at points convenient to each of said conditioners, said control means including means for preventing the operation of more than one conditioner at a time, each of said control means being operable to overcome the control setting of the other control means to selectively control the operation of any one of the conditioners.

13. An air conditioning system including a conditioner having fan means and air tempering means located in each of a plurality of spaces to be conditioned, separate selective control means at points convenient to each of said spaces to be conditioned, each of said control means being operable to overcome the setting of the other control means to selectively control the operation of any one of the conditioners.

14. In a control system for air conditioning apparatus, the combination of a plurality of air cooling devices, a refrigerating machine common to said devices for supplying liquid refrigerant thereto, means for conveying gaseous refrigerant from the devices to said machine, means responsive to a pressure condition of the gaseous refrigerant conveyed from the devices for initiating and terminating operation of the machine, means associated with at least one device for controlling the supply of liquid refrigerant thereto in response to a condition of the air in the space cooled by the device, switching means for rendering the last-mentioned means operable and inoperable, and means for circulating air through the device for ventilation during the full period that the refrigerant supply controlling means is rendered operable by the switching means.

15. In a control system for air conditioning apparatus, the combination of a plurality of air cooling devices, a refrigerating machine common to said devices for supplying liquid refrigerant thereto, means for conveying gaseous refrigerant from the devices to said machine, means responsive to a pressure condition of the gaseous refrigerant conveyed from the devices for initiating and terminating operation of the machine, means associated with at least one device for controlling the supply of liquid refrigerant thereto, switching means for rendering the last-mentioned means operable and inoperable, and means for circulating air through the device for ventilation during the full period that the refrigerant supply controlling means is rendered operable by the switching means.

16. In a control system for air conditioning apparatus, the combination of a plurality of air cooling devices, a refrigerating machine common to said devices for supplying liquid refrigerant thereto, conduits connecting said devices and said machine for conveying gaseous refrigerant from the former to the latter, means responsive to the pressure of the refrigerant in said conduit for controlling the operation of the machine, means associated with at least one cooling device for controlling the supply of liquid refrigerant thereto in response to a condition of the air in the space cooled by the device, a switch for rendering the last-mentioned means operable or inoperable, and means for conveying air through said cooling device for ventilation during the full period that the refrigerant supply controlling means is rendered operable by the switch.

17. The combination of a plurality of evaporators, means for providing a supply of refrigerant for the evaporators, a plurality of valves for controlling the flow of refrigerant from the supply means to said evaporators, an electrically-operated mechanism associated with each valve for opening and closing the same, and an electrical circuit which effects opening operation of a selected valve and renders another valve incapable of being opened.

18. The combination of a plurality of evaporators, means for providing a supply of refrigerant for the evaporators, a plurality of valves for controlling the flow of refrigerant from the supply means to said evaporators, an electrically-operated mechanism associated with each valve for opening and closing the same, an electrical circuit for each mechanism which, when energized, effects opening operation thereof, and switch means capable of opening any one of said valves and of rendering another of said valves incapable of being opened.

DON E. DASHER.